US012757116B2

(12) United States Patent
Wei et al.

(10) Patent No.: US 12,757,116 B2
(45) Date of Patent: Oct. 6, 2026

(54) COMMUNICATION TIME FRAME FOR ENERGY HARVESTING DEVICE

(71) Applicant: QUALCOMM Incorporated, San Diego, CA (US)

(72) Inventors: Chao Wei, Beijing (CN); Ruiming Zheng, Beijing (CN); Peter Gaal, San Diego, CA (US); Wanshi Chen, San Diego, CA (US); Kangqi Liu, San Diego, CA (US); Hao Xu, Beijing (CN); Min Huang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 18/716,247

(22) PCT Filed: Feb. 5, 2022

(86) PCT No.: PCT/CN2022/075321

§ 371 (c)(1),
(2) Date: Jun. 4, 2024

(87) PCT Pub. No.: WO2023/147694

PCT Pub. Date: Aug. 10, 2023

(65) Prior Publication Data

US 2025/0039795 A1 Jan. 30, 2025

(51) Int. Cl.
*H04W 52/02* (2009.01)
*H04W 24/10* (2009.01)
*H04W 76/28* (2018.01)

(52) U.S. Cl.
CPC ....... *H04W 52/0235* (2013.01); *H04W 24/10* (2013.01); *H04W 76/28* (2018.02)

(58) Field of Classification Search
CPC . H04W 52/0235; H04W 24/10; H04W 76/28; H04W 52/028; H04W 88/06;
(Continued)

(56) References Cited

U.S. PATENT DOCUMENTS

2014/0050133 A1* 2/2014 Jafarian .............. H04W 74/085 370/311
2015/0201342 A1* 7/2015 Vannithamby ............ H04L 5/14 370/254
2018/0220448 A1* 8/2018 Akkarakaran .... H04W 74/0833

FOREIGN PATENT DOCUMENTS

EP 3337248 A1 6/2018
WO WO-2020131907 A1 6/2020

OTHER PUBLICATIONS

Arshad I., et al., "Communication MAC Protocol for Coexisting Wireless Devices and Backscatter Tags", 2020 14Th International Conference On Ubiquitous Information Management and Communication, IEEE, Jan. 3, 2020, 6 Pages, The whole document.

(Continued)

*Primary Examiner* — Kiet Tang
(74) *Attorney, Agent, or Firm* — Harrity & Harrity, LLP

(57) ABSTRACT

Various aspects of the present disclosure generally relate to wireless communication. In some aspects, a first device may transmit a message indicating that the first device is operating on intermittently available energy harvested from outside the first device. The first device may receive a low-power wakeup signal. The first device may transmit, based at least in part on an energy harvesting state of the first device, an indication that the first device is capable of supporting continuous transmission and reception during a time frame having a configured duration. The first device may communicate during the time frame. Numerous other aspects are described.

30 Claims, 11 Drawing Sheets

(58) Field of Classification Search
CPC .......... H02J 50/80; H02J 50/20; H02J 50/001; Y02D 30/70
See application file for complete search history.

(56) References Cited

OTHER PUBLICATIONS

Ericsson: "Ericsson Views on Rell8", 3GPP RAB-Rel-18 workshop RWS-210329, Jun. 8, 2021, pp. 1-22, The whole document.
International Search Report and Written Opinion—PCT/CN2022/075321—ISA/EPO—Oct. 25, 2022.

* cited by examiner

COMMUNICATION TIME FRAME FOR ENERGY HARVESTING DEVICE

CROSS-REFERENCE TO RELATED APPLICATION

This patent application is a 371 national stage of PCT Application No. PCT/CN2022/075321 filed on Feb. 5, 2022, entitled "COMMUNICATION TIME FRAME FOR ENERGY HARVESTING DEVICE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for a communication time frame for an energy harvesting device.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first device. The method may include transmitting a message indicating that the first device is operating on intermittently available energy harvested from outside the first device. The method may include receiving a low-power wakeup signal (WUS). The method may include transmitting, based at least in part on an energy harvesting state of the first device, an indication that the first device is capable of supporting continuous transmission and reception during a time frame having a configured duration. The method may include communicating during the time frame.

Some aspects described herein relate to a method of wireless communication performed by a second device. The method may include receiving a message indicating that a first device is operating on intermittently available energy harvested from outside the first device. The method may include transmitting a low-power WUS. The method may include receiving, in response to transmitting the WUS, an indication that the first device is capable of supporting continuous transmission and reception during a time frame having a configured duration. The method may include communicating with the first device during the time frame.

Some aspects described herein relate to a first device for wireless communication. The first device may include a memory and one or more processors coupled to the memory. The one or more processors may be configured to transmit a message indicating that the first device is operating on intermittently available energy harvested from outside the first device. The one or more processors may be configured to receive a low-power WUS. The one or more processors may be configured to transmit, based at least in part on an energy harvesting state of the first device, an indication that the first device is capable of supporting continuous transmission and reception during a time frame having a configured duration. The one or more processors may be configured to communicate during the time frame.

Some aspects described herein relate to a second device for wireless communication. The second device may include a memory and one or more processors coupled to the memory. The one or more processors may be configured to receive a message indicating that a first device is operating on intermittently available energy harvested from outside the first device. The one or more processors may be configured to transmit a low-power WUS. The one or more processors may be configured to receive, in response to transmitting the WUS, an indication that the first device is capable of supporting continuous transmission and reception during a time frame having a configured duration. The one or more processors may be configured to communicate with the first device during the time frame.

Some aspects described herein relate to a non-transitory computer-readable medium that stores a set of instructions for wireless communication by a first device. The set of instructions, when executed by one or more processors of the first device, may cause the first device to transmit a message indicating that the first device is operating on intermittently available energy harvested from outside the first device. The set of instructions, when executed by one or more processors of the first device, may cause the first device to receive a low-power WUS. The set of instructions, when executed by one or more processors of the first device, may cause the first device to transmit, based at least in part on an energy harvesting state of the first device, an indication that the first device is capable of supporting continuous transmission and reception during a time frame having a configured duration. The set of instructions, when executed by one or more processors of the first device, may cause the first device to communicate during the time frame.

Some aspects described herein relate to a non-transitory computer-readable medium that stores a set of instructions for wireless communication by a second device. The set of instructions, when executed by one or more processors of the second device, may cause the second device to receive a message indicating that a first device is operating on intermittently available energy harvested from outside the first device. The set of instructions, when executed by one or more processors of the second device, may cause the second device to transmit a low-power WUS. The set of instructions, when executed by one or more processors of the second device, may cause the second device to receive, in response to transmitting the WUS, an indication that the first device is capable of supporting continuous transmission and reception during a time frame having a configured duration. The set of instructions, when executed by one or more processors of the second device, may cause the second device to communicate with the first device during the time frame.

Some aspects described herein relate to an apparatus for wireless communication. The apparatus may include means for transmitting a message indicating that the apparatus is operating on intermittently available energy harvested from outside the apparatus. The apparatus may include means for receiving a low-power WUS. The apparatus may include means for transmitting, based at least in part on an energy harvesting state of the apparatus, an indication that the apparatus is capable of supporting continuous transmission and reception during a time frame having a configured duration. The apparatus may include means for communicating during the time frame.

Some aspects described herein relate to an apparatus for wireless communication. The apparatus may include means for receiving a message indicating that a first device is operating on intermittently available energy harvested from outside the first device. The apparatus may include means for transmitting a low-power WUS. The apparatus may include means for receiving, in response to transmitting the WUS, an indication that the first device is capable of supporting continuous transmission and reception during a time frame having a configured duration. The apparatus may include means for communicating with the first device during the time frame.

Aspects generally include a method, apparatus, system, computer program product, non-transitory computer-readable medium, user equipment, wireless device, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
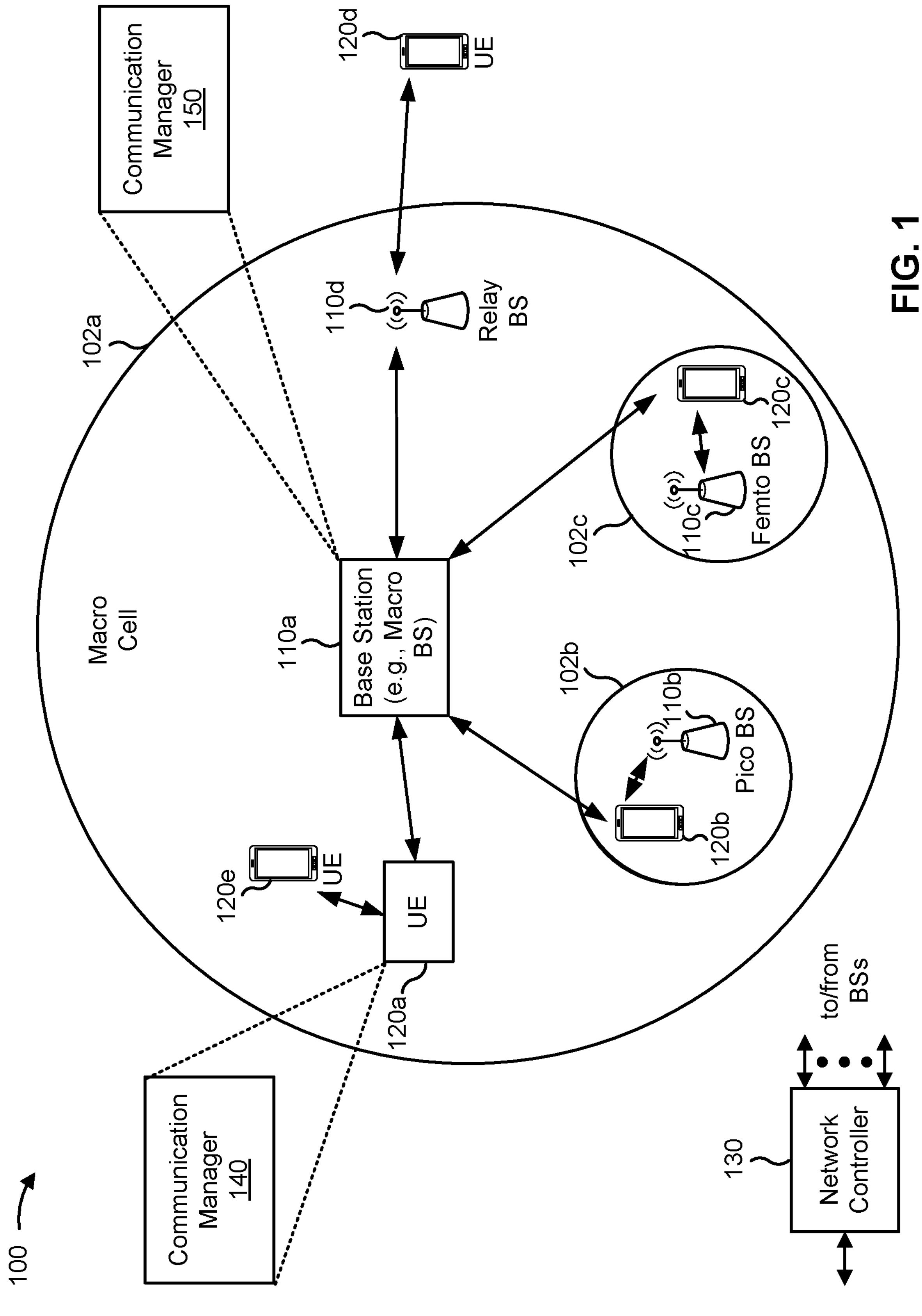
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a user equipment (UE) 120 or multiple UEs 120 (shown as a UE 120*a*, a UE 120*b*, a UE 120*c*, a UE 120*d*, and a UE 120*e*). The wireless network 100 may also include one or more network entities, such as base stations 110 (shown as a BS 110*a*, a BS 110*b*, a BS 110*c*, and a BS 110*d*), and/or other network entities. A base station 110 is a network entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set network entities and may provide coordination and control for these network entities. The network controller 130 may communicate with the base stations 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first device (e.g., a IoT device, a zero power device, a UE 120) may include a communication manager 140. As described in more detail elsewhere herein, the communication manager 140 may transmit a message indicating that the first device is operating on intermittently available energy harvested from outside the first device; receive a low-power wakeup signal (WUS). The communication manager 140 may transmit, based at least in part on an energy harvesting state of the first device, an indication that the first device is capable of supporting continuous transmission and reception during a time frame having a configured duration. The communication manager 140 may communicate during the time frame. Additionally, or alternatively, the communication manager 140 may perform one or more other operations described herein.

In some aspects, a second device (e.g., a UE 120, network entity) may include a communication manager 140 or 150. As described in more detail elsewhere herein, the communication manager 140 or 150 may receive a message indicating that a first device is operating on intermittently available energy harvested from outside the first device; transmit a low-power WUS. The communication manager 140 or 150 may receive, in response to transmitting the WUS, an indication that the first device is capable of supporting continuous transmission and reception during a time frame having a configured duration. The communication manager 140 or 150 may communicate with the first device during the time frame. Additionally, or alternatively, the communication manager 140 or 150 may perform one or more other operations described herein.

As indicated above, FIG. 1 is provided as an example. Other examples may differ from what is described with regard to FIG. 1.

Figure 2:
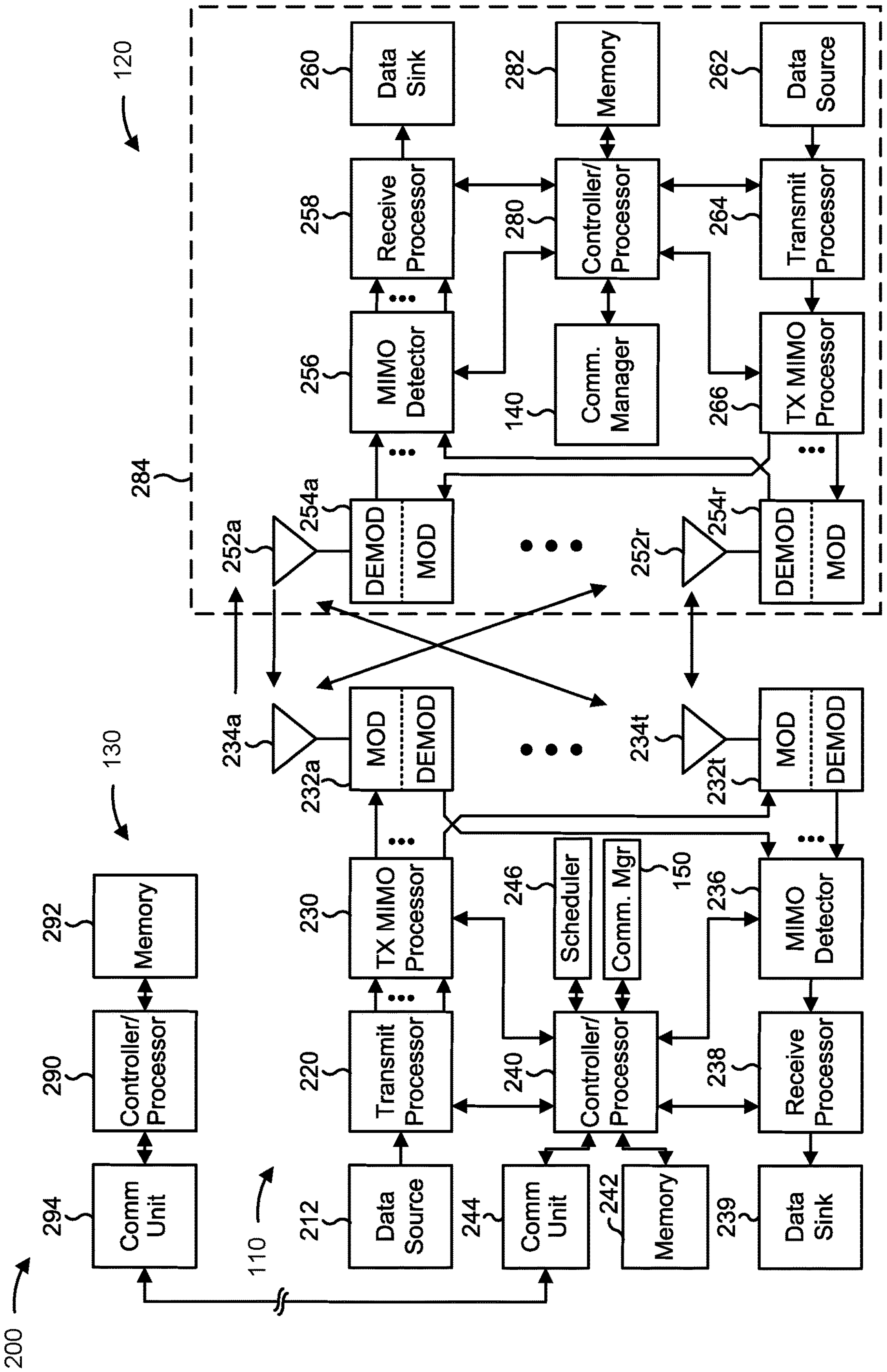
FIG. 2 is a diagram illustrating an example of a network entity in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

A controller/processor of a network entity, (e.g., the controller/processor 240 of the base station 110), the controller/processor 280 of the UE 120, and/or any other component(s) of FIG. 2 may perform one or more techniques associated with using an adaptable communication time frame for an energy harvesting device, as described in more detail elsewhere herein. In some aspects, the first device described herein is the UE 120, is included in the UE 120, or includes one or more components of the UE 120 shown in FIG. 2. In some aspects, the first device described herein is the UE 120, is included in the UE 120, or includes one or more components of the UE 120 shown in FIG. 2. In some aspects, the second device described herein is the network entity, is included in the network entity, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a first device (e.g., a IoT device, a zero power device, a UE 120) includes means for transmitting a message indicating that the first device is operating on intermittently available energy harvested from outside the first device; means for receiving a low-power WUS; means for transmitting, based at least in part on an energy harvesting state of the first device, an indication that the first device is capable of supporting continuous transmission and reception during a time frame having a configured duration; and/or means for communicating during the time frame. In some aspects, the means for the first device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second device (e.g., a UE 120, network entity) includes means for receiving a message indicating that a first device is operating on intermittently available energy harvested from outside the first device; means for transmitting a low-power WUS; means for receiving, in response to transmitting the WUS, an indication that the first device is capable of supporting continuous transmission and reception during a time frame having a configured duration; and/or means for communicating with the first device during the time frame. In some aspects, the means for the second device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the second device to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
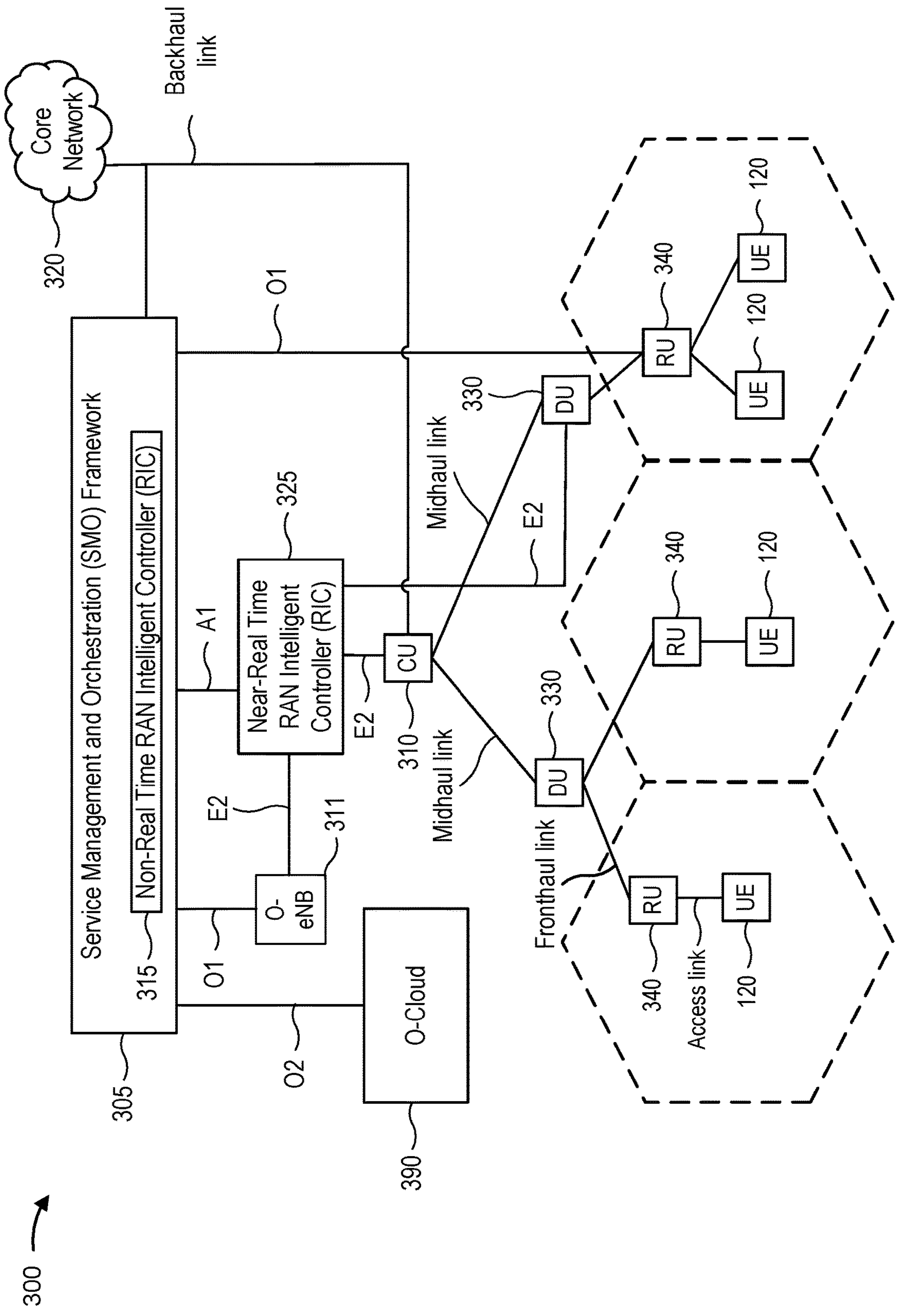
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-Real Time (Near-RT) RIC 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more radio frequency (RF) access links. In some aspects, the UE 120 may be simultaneously served by multiple RUs 340. The DUs 330 and the RUs 340 may also be referred to as "O-RAN DUs (O-DUs") and "O-RAN RUS (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units, i.e., the CUS 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390)

to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

Figure 4:
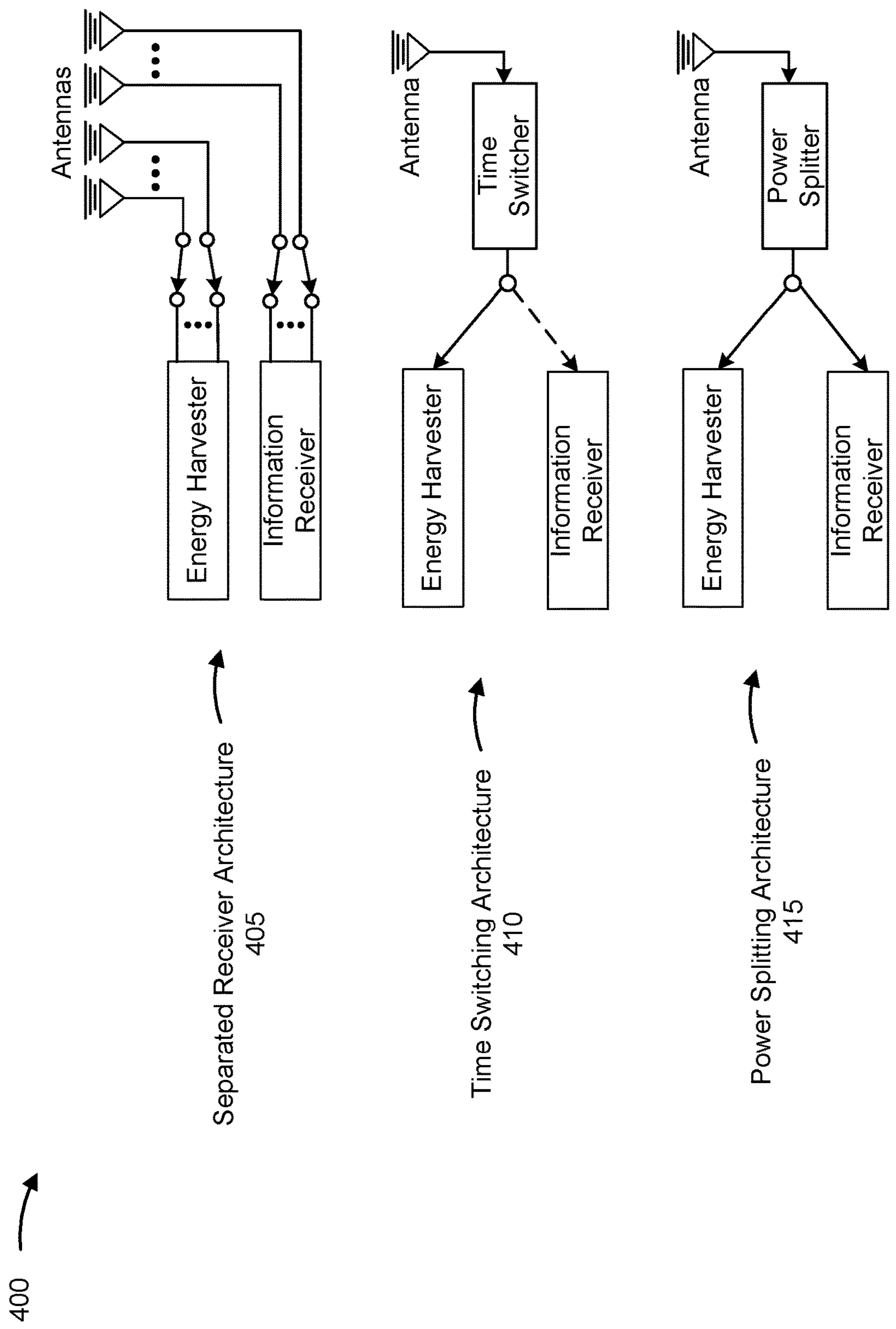
FIG. 4 is a diagram illustrating an example of energy harvesting, in accordance with the present disclosure.

FIG. 4 is a diagram illustrating an example 400 of energy harvesting, in accordance with the present disclosure.

Energy harvesting includes a device obtaining energy from a source other than an on-device battery. This may include obtaining energy from a source outside of the device. Devices that use energy harvesting may have a small energy storage device or battery (e.g., smart watch, RedCap devices, eRedCap devices) or no energy storage device or battery (e.g., zero-power devices, IoT devices, wearables, or financial devices). Energy harvesting may include converting RF energy transferred from another device. The harvesting of RF energy may not fully charge a battery but may be used for some tasks like data decoding, operating some filters, data reception, data encoding, data reception, and/or data transmission. The energy may be accumulated over time. Energy harvesting may also be a part of self-sustainable networks, where a node in the network can interact in the network through the energy harvested in the network through transmissions.

As shown in FIG. 4, an RF receiver (e.g., a UE 120) may receive signals (e.g., radio signals carried on radio waves) from an RF transmitter (e.g., a base station 110 or UE 120) and convert electromagnetic energy of the signals (e.g., using a rectenna comprising a dipole antenna with an RF diode) into direct current electricity for use by the RF receiver. The RF receiver may be a low-power device or a zero-power device. The RF transmitter may be referred to as a "charging device."

As shown by reference number 405, in some aspects, the RF receiver may use a separated receiver architecture, where a first set of antennas is configured to harvest energy, and a second set of antennas is configured to receive data. In this scenario, each set of antennas may be separately configured to receive signals at certain times, frequencies, and/or via one or more particular beams, such that all signals received by the first set of antennas are harvested for energy, and all signals received by the second set of antennas are processed to receive information.

As shown by reference number 410, in some aspects, the RF receiver may use a time-switching architecture to harvest energy. The time switching architecture may use one or more antennas to receive signals, and whether the signals are harvested for energy or processed to receive information depends on the time at which the signals are received. For example, one or more first time slots may be time slots during which received signals are sent to one or more energy harvesting components to harvest energy, and one or more second time slots may be time slots during which received signals are processed and decoded to receive information. In some aspects, the time slots may be pre-configured (e.g., by the RF receiver, the RF transmitter, or another device).

As shown by reference number 415, in some aspects, the RF receiver may use a power splitting architecture to harvest energy. The power splitting architecture may use one or more antennas to receive signals, and the signals are handled by one or both of the energy harvesting and/or information receiving components according to an energy harvesting rate. For example, the RF receiver may be configured to use a first portion of received signals for energy harvesting and the remaining received signals for information receiving. The energy harvesting mode for a device may be semi-statistically configured by RRC messaging. In some aspects, the energy harvesting rate may be pre-configured (e.g., by the RF receiver, the RF transmitter, or another device). Communications with a network entity may be required, even in the energy harvesting mode, but with a reduced radio capability to reduce power consumption.

The RF receiver may receive signals for energy harvesting on certain resources (e.g., time, frequency, and/or spatial resources) and at a certain power level that results in a particular charging rate. Energy harvested by the RF receiver may be used and/or stored for later use. For example, in some aspects, the RF receiver may be powered directly by the harvested energy. In some aspects, the RF receiver may use an energy storage device, such as a battery, capacitor, and/or supercapacitor, to gather and store harvested energy for immediate and/or later use.

The energy harvesting device may have a low-power or wake-up radio that is configured to detect a low-power WUS but not perform other communications. The energy harvesting device may have a main radio that is configured to perform communications and that consumes more power than the low-power radio or wake-up radio. The energy harvesting device may have limited RF capabilities (less than enhanced UE) or full RF capabilities (comparable to enhanced UE).

Energy harvesting devices, more generally, may rely equally or differently on different energy harvesting techniques such as solar power, vibration, thermal energy, or RF energy harvesting. Energy harvesting can be predictable or unpredictable due to the energy being intermittently available. However, current communications use fixed activity cycles for transmission and reception, such as an on duration of an active discontinuous reception (DRX) cycle. The active DRX cycle may include a part of the DRX cycle when a DRX on-duration timer (time UE is monitoring for physical downlink control channel (PDCCH) communications) or a DRX inactivity timer (time UE is active after successfully decoding a PDCCH communication) is running. A timer may run once it is started, until it is stopped or until it expires; otherwise it is not running. A timer may start if it is not running or restarted if it is running. A timer may be started or restarted from its initial value.

The activity cycle may be too long or not long enough based on an amount of energy being harvested, a timing of intermittently available energy, and/or an amount of energy harvested. If the activity cycle is too long, some communications may be lost when the energy harvesting device does not have enough energy to sustain continuous transmission and reception during the full activity cycle. Continuous transmission and reception may refer to transmission, reception, or both transmission and reception. If the activity cycle is too short, there may be additional latency or an inefficient use of processing resources and signaling resources.

As indicated above, FIG. 4 is provided as an example. Other examples may differ from what is described with regard to FIG. 4.

Figure 5:
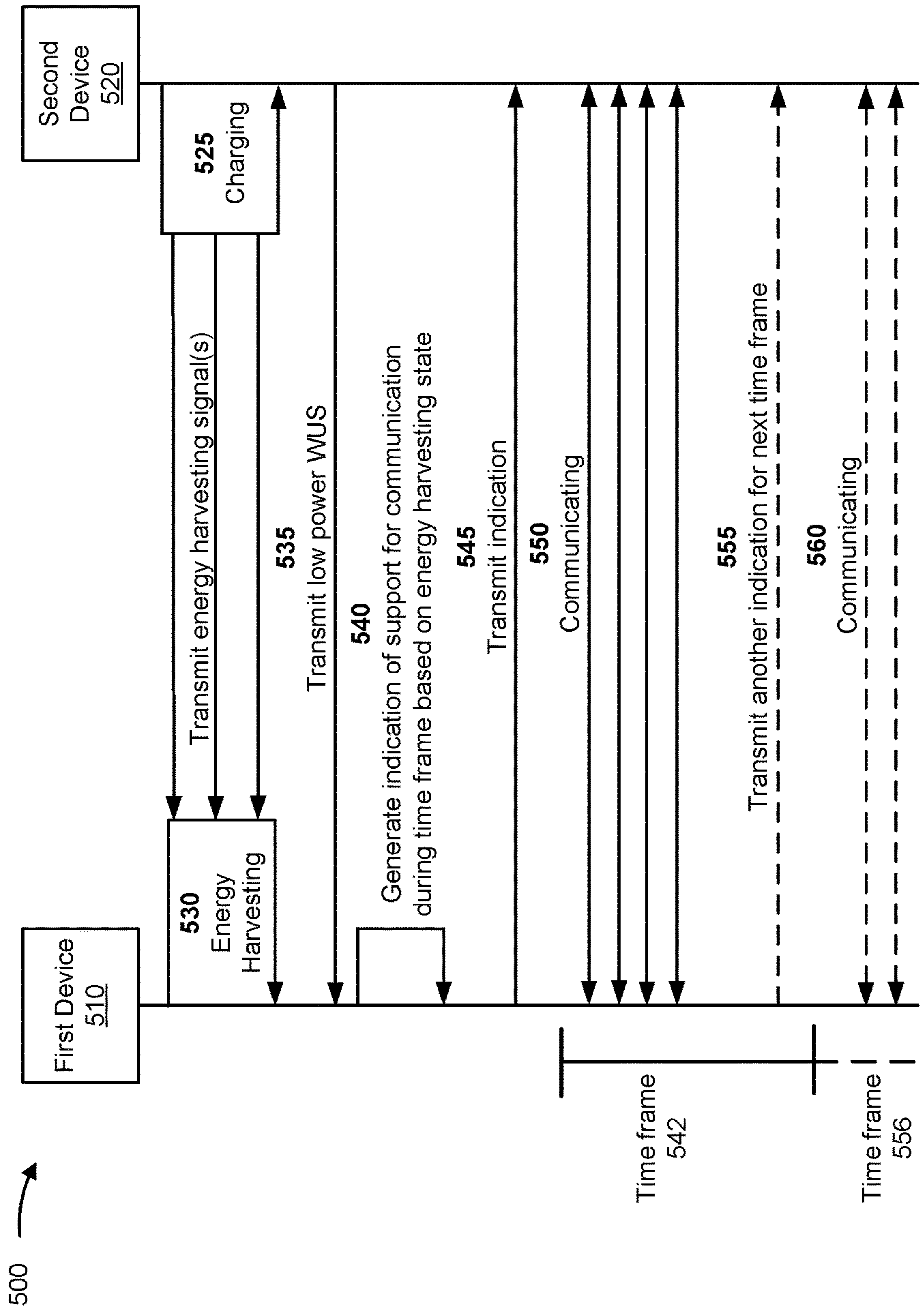
FIG. 5 is a diagram illustrating an example associated with indicating a maximum duration for a request for energy, in accordance with the present disclosure.

FIG. 5 is a diagram illustrating an example 500 associated with indicating a maximum duration for a request for energy, in accordance with the present disclosure. As shown in FIG. 5, a first device 510 (e.g., IoT, zero power device, a UE 120) may harvest energy from a second (charging) device 520 (e.g., UE 120, network entity).

According to various aspects described herein, the first device may, based at least in part on an energy harvesting state of the first device, indicate that the first device is capable of supporting continuous transmission and reception during a time frame having a configured duration. An energy harvesting state may be based at least in part on one or more of an amount of the intermittently available energy that is being harvested or an amount of harvested energy that is being stored at the first device. The configured duration may be adaptable, may be equal to an active DRX cycle, may be less than an active DRX cycle, or may be more than an active DRX cycle. As a result of indicating support for an adaptable time frame for continuous transmission and reception, the first device may be more energy efficient and have functionality that matches its energy capabilities. The second device may control the adaptation of the first device to intermittent communications with UE assistance information reporting.

Example 500 shows the first device 510 may be in an energy harvesting state where the first device 510 can harvest energy from RF signals. As shown by reference number 525, the second device 520 may transmit signals to the first device 510. As shown by reference number 530, the first device 510 may harvest the energy from the signals and store the energy in an energy storage device (e.g., battery) or simultaneously use another radio or set of antennas for communications. The first device 510 may be in a sleep state during energy harvesting.

As shown by reference number 535, the second device 520 may transmit a WUS (e.g., low-power WUS) to the first device 510. The WUS may wake up the first device 510 and trigger the first device 510 to monitor for PDCCH communications in the next DRX on duration.

As shown by reference number 540, the first device 510 may, based at least in part on an energy harvesting state, generate an indication that the first device 510 is capable of supporting continuous transmission and reception during a time frame 542 having a configured duration. The first device 510 may generate the indication after waking up in response to detecting the low-power WUS.

As shown by reference number 545, the first device 510 may transmit the indication. The indication may include a bit to indicate the time frame or a recommendation of a maximum duration for the time frame. The second device 520 may configure the duration of the time frame 542 to be up to the maximum duration. The first device 510 may start a transmission and reception timer when the time frame 542 starts. The duration of the transmission and reception timer may correspond to the configured duration of the time frame 542.

As shown by reference number 550, the first device 510 and the second device 520 may communicate during the time frame 542. When the transmission and reception timer expires, the first device 510 is not expected to communicate any longer. The second device 520 may maintain the same transmission and reception timer to determine when to communicate or not communicate with the first device 510.

In some aspects, the first device 510 may start an inactivity timer after the transmission and reception timer expires. The first device 510 may remain active during the inactivity timer. After the inactivity timer expires, the first device 510 may transition to an idle state. The inactivity timer may stop when the transmission and reception timer starts.

Alternatively, in some aspects, the first device 510 may generate an indication that indicates that the first device 510 cannot support continuous transmission and reception during a time frame 542, or the first device 510 may not transmit (skip) the indication. This indication may be due to the first device 510 having an energy input that does not satisfy an energy input threshold (e.g., minimum energy input) or a battery status that does not satisfy a battery threshold (e.g., minimum battery power percentage or value).

In some aspects, before the end of the time frame 542 (when the first device 510 is in a DRX active time), as shown by reference number 555, the first device 510 may transmit another indication to inform the second device 520 that the first device 510 is capable of communicating during the next time frame 556. The first device 510 may restart or extend the transmission and reception timer. As shown by reference number 560, the first device 510 and the second device 520 may communicate during the next time frame 556.

By indicating a time frame of a configured duration that may vary from a DRX active time, the first device 510 may have more flexibility to manage communications and to manage and conserve power.

As indicated above, FIG. 5 is provided as an example. Other examples may differ from what is described with respect to FIG. 5.

Figure 6:
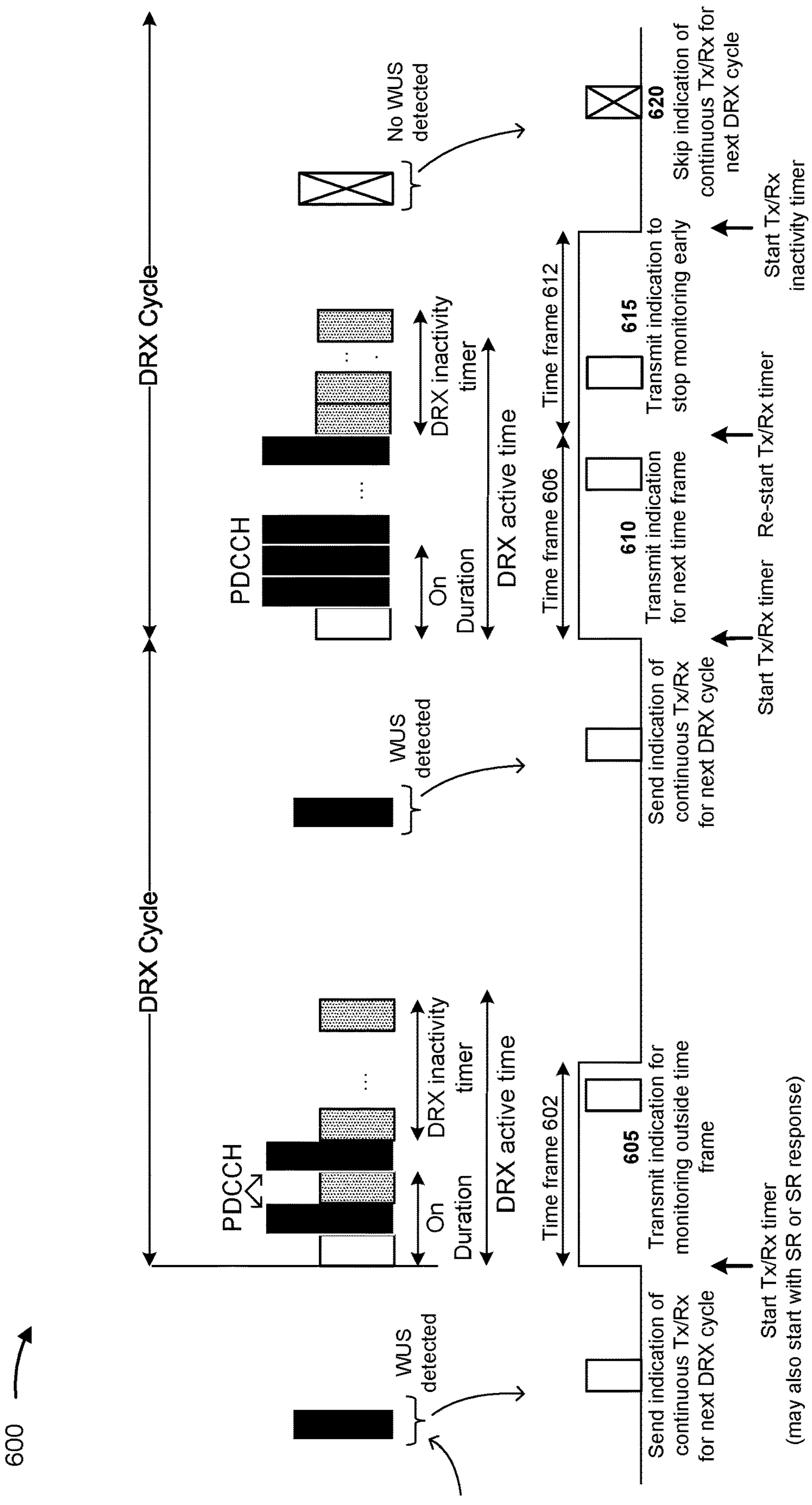
FIG. 6 is a diagram illustrating an example of using time frames during discontinuous reception cycles, in accordance with the present disclosure.

FIG. 6 is a diagram illustrating an example 600 of using time frames during DRX cycles, in accordance with the present disclosure. Example 600 shows actions by the first device 510 and the second device 520 shown in FIG. 5.

Example 600 shows a time frame 602 that starts after the first device 510 detects a WUS and transmits an indication that the first device 510 is capable of supporting continuous transmission and reception during the time frame 602. The first device 510 may also start the transmission and reception (Tx/Rx) timer from the next DRX on duration.

In some aspects, when uplink data arrives and the first device 510 is in an RRC connected mode, the first device 510 may transmit a scheduling request (SR) only if the first device 510 is capable of continuous transmission and reception during the time frame 602. In some aspects, the SR may be transmitted in a slot, and the transmission and reception timer may start from the slot. In some aspects, the transmission and reception timer may start from a slot in which a PDCCH communication is received in response to the SR transmission.

As part of a first DRX cycle, the first device 510 may monitor for PDCCH communications during the on duration (on-duration timer running) and remain active during a DRX inactivity timer that follows the on-duration timer. In the first DRX cycle, the first device 510 does not monitor for PDCCH communications outside of the time frame 602 and during the DRX inactivity timer. The first device 510 may stop the DRX inactivity timer when the transmission and reception time stops.

However, in some aspects, as shown by reference number 605, the first device 510 may transmit an indication that the first device 510 is capable of monitoring for PDCCH communications in a DRX active time that is outside the time frame 542. The first device 510 may proceed with monitoring for PDCCH communications in the DRX active time outside the time frame 542, but the first device may not otherwise communicate during the time outside the time frame 542.

In some aspects, dynamically scheduled transmissions and receptions may be restricted to the DRX active time. In contrast to a non-energy harvesting device, the first device 510 may not be expected to be scheduled outside the DRX active time.

As part of a second DRX cycle, example 600 shows a time frame 606 that starts after a next WUS is detected and after another time frame indication is transmitted. As shown by reference number 610, the first device 510 may transmit an indication that continuous transmission and reception during the next time frame 612 is supported. This may include restarting the transmission and reception timer.

In some aspects, as shown by reference number 615, the second device 520 may transmit an indication (e.g., 1 bit) to stop monitoring for PDCCH communications in a DRX active time, before the time frame 606 ends. The first device 510 may stop monitoring for PDCCH communications early, without waiting until the DRX inactivity timer expires. This may conserve power when no further uplink or downlink data is scheduled for transmission. The PDCCH monitoring may resume as normal in the next DRX cycle.

In some aspects, the first device 510 may maintain another inactivity timer (e.g., transmission and reception inactivity timer) that starts or restarts whenever the transmission and reception timer expires and stops whenever the transmission and reception timer starts. The first device 510 may be expected to provide at least one indication for continuous transmission and reception before the inactivity timer expires. Otherwise, the second device 520 may transition the first device 510 to an RRC idle state. This may include if a WUS is detected. If no WUS is detected, as shown by reference number 620, no indication is provided.

In some aspects, if the first device 510 is in an RRC idle or inactive state, the first device 510 may be expected to support continuous transmission and reception during the time frame 602 that the first device 510 initiates an RRC connection setup, a resume request, or performs an uplink small data transmission (SDT). In some aspects, the first device 510 may start the transmission and reception timer at the slot of a preamble or an SDT. In some aspects, the first device 510 may start the transmission and reception timer at the slot at which a PDCCH is received in response to the preamble or the SDT.

As indicated above, FIG. 6 is provided as an example. Other examples may differ from what is described with regard to FIG. 6.

Figure 7:
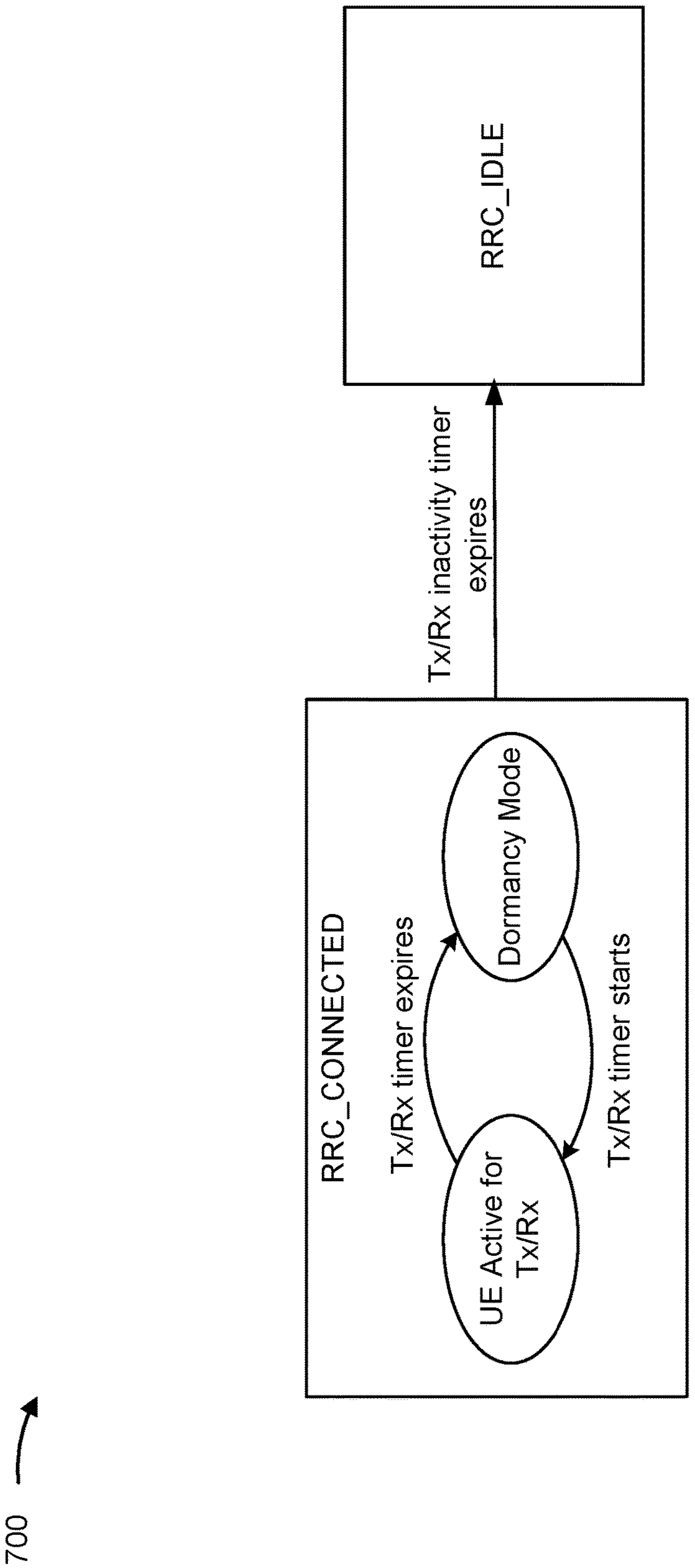
FIG. 7 is a diagram illustrating an example of device operation states, in accordance with the present disclosure.

FIG. 7 is a diagram illustrating an example 700 of device operation states, in accordance with the present disclosure.

In some aspects, the first device 510 may enter a dormancy mode within a connected state (RRC connected state) based at least in part on a transmission and reception timer not running. While in the dormancy mode, communications may be suspended. In some aspects, as a first option, the first device 510 may turn off the main radio or set the main radio to sleep while using a wake-up radio to monitor for a low-power WUS. In some aspects, as a second option, the first device 510 may apply an operation used for a dormant bandwidth part (BWP) in a secondary cell (SCell) to both a primary cell (PCell) and the SCell serving the first device 510. The time of the dormancy mode may correspond to the transmission and reception inactivity timer that starts after the transmission and reception timer for the time frame expires. The time of the dormancy mode may be based at least in part on a maximum value for the transmission and reception inactivity timer.

In some aspects, the first device 510 may switch to the dormancy mode before the transmission and reception timer expires. The trigger may be based at least in part on a predicted energy outage for a future event.

In some aspects, when operating in a downlink dormancy mode (under the second option), the first device 510 may stop monitoring for PDCCH communications (expect still monitor for a PDCCH-WUS) and/or suspend semi-persistent scheduling (SPS) PDSCHs. The first device 510 may stop beam or channel state information (CSI) measurements configured by RRC (e.g., via request by the first device 510 in a dormancy request message). The first device 510 may relax radio resource management (RRM) procedures for neighbor cells, including performing neighbor cell measurements on only a single type of reference signal (e.g., synchronization signal block (SSB) but not both SSB and CSI reference signal (CSI-RS)).

In some aspects, when operating in an uplink dormancy mode (under the second option), the first device 510 may stop sounding reference signal (SRS) transmissions and physical uplink shared channel (PUSCH) transmissions that are based on a configured uplink grant. This may include stopping aperiodic SRSs (A-SRSs), and periodic SRSs (P-SRSs). The first device 510 may support and maintain periodic CSI and semi-persistent CSI but stop aperiodic CSI reporting.

In some aspects, the first device 510 may perform a combination of the first option and the second option. In some aspects, the first device 510 may perform the second option if a value of the transmission and reception inactivity timer does not satisfy, or is less than, a time threshold (e.g., minimum duration within inactivity timer), or otherwise perform the first option.

By using a dormancy mode within a connected state, the first device 510 may have more flexibility to manage operations and to conserve power.

As indicated above, FIG. 7 is provided as an example. Other examples may differ from what is described with regard to FIG. 7.

Figure 8:
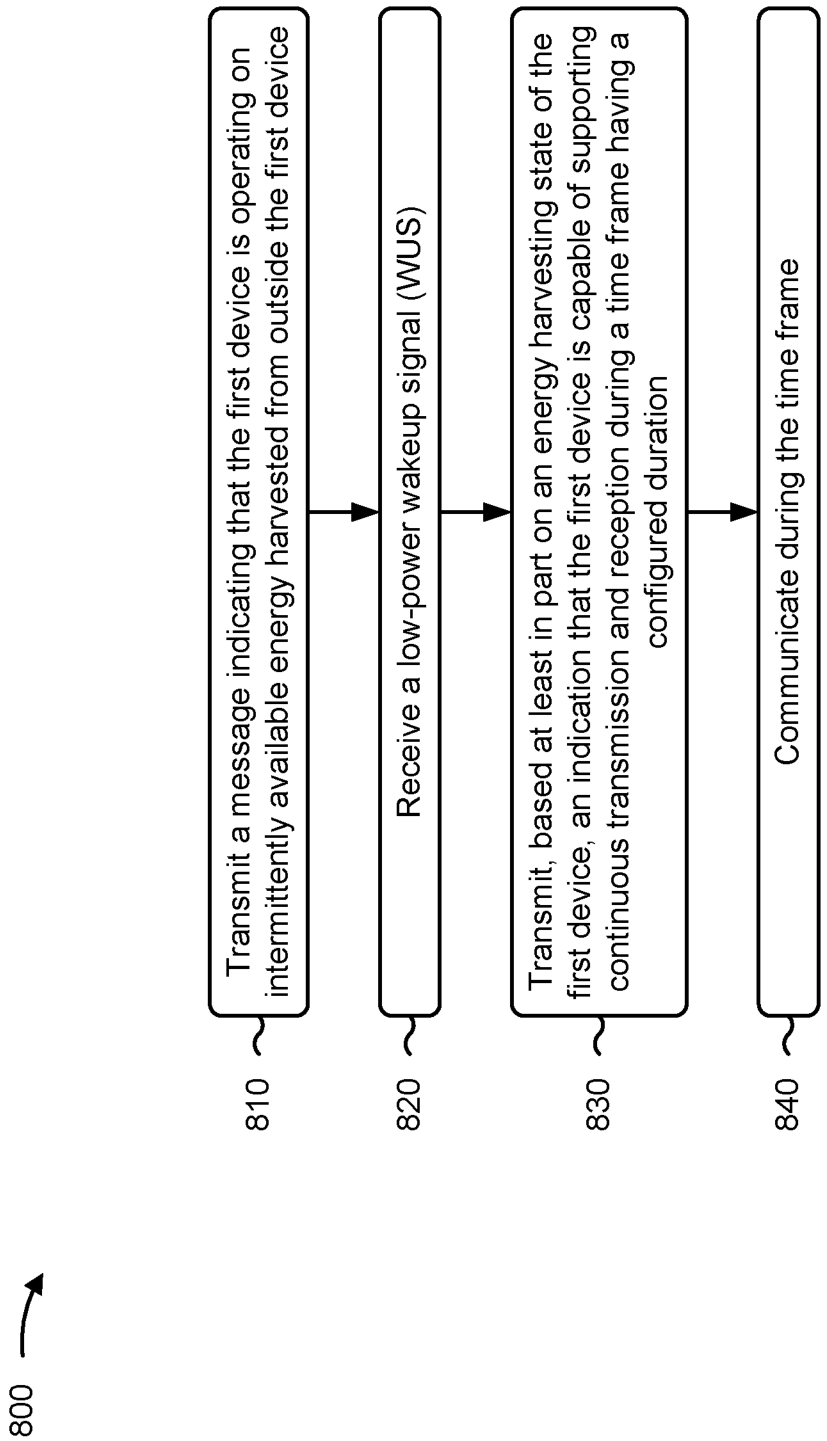
FIG. 8 is a diagram illustrating an example process performed, for example, by a first device, in accordance with the present disclosure.

FIG. 8 is a diagram illustrating an example process 800 performed, for example, by a first device, in accordance with the present disclosure. Example process 800 is an example where the first device (e.g., first device 510) performs operations associated with a communication time frame for an energy harvesting device.

As shown in FIG. 8, in some aspects, process 800 may include transmitting a message indicating that the first device is operating on intermittently available energy harvested from outside the first device (block 810). For example, the first device (e.g., using communication manager 1008 and/or transmission component 1004 depicted in FIG. 10) may transmit a message indicating that the first device is operating on intermittently available energy harvested from outside the first device, as described above.

As further shown in FIG. 8, in some aspects, process 800 may include receiving a low-power WUS (block 820). For example, the first device (e.g., using communication manager 1008 and/or reception component 1002 depicted in FIG. 10) may receive a low-power WUS, as described above.

As further shown in FIG. 8, in some aspects, process 800 may include transmitting, based at least in part on an energy harvesting state of the first device, an indication that the first device is capable of supporting continuous transmission and reception during a time frame having a configured duration (block 830). For example, the first device (e.g., using communication manager 1008 and/or transmission component 1004 depicted in FIG. 10) may transmit, based at least in part on an energy harvesting state of the first device, an indication that the first device is capable of supporting continuous transmission and reception during a time frame having a configured duration, as described above.

As further shown in FIG. 8, in some aspects, process 800 may include communicating during the time frame (block 840). For example, the first device (e.g., using communication manager 1008, transmission component 1004, and/or reception component 1002 depicted in FIG. 10) may communicate during the time frame, as described above.

Process 800 may include additional aspects, such as any single aspect or any combination of aspects described below and/or in connection with one or more other processes described elsewhere herein.

In a first aspect, transmitting the indication includes transmitting the indication in response to the WUS.

In a second aspect, alone or in combination with the first aspect, the energy harvesting state is based at least in part on one or more of an amount of the intermittently available energy that is being harvested or an amount of harvested energy that is being stored at the first device.

In a third aspect, alone or in combination with one or more of the first and second aspects, process 800 includes transmitting, during the time frame, an indication that the first device is capable of extending the continuous transmission and reception into a next time frame, and communicating during the next time frame.

In a fourth aspect, alone or in combination with one or more of the first through third aspects, process 800 includes starting a transmission and reception timer that corresponds to the duration of the time frame from the next DRX on duration.

In a fifth aspect, alone or in combination with one or more of the first through fourth aspects, process 800 includes starting an inactivity timer after the transmission and reception timer expires, the first device transitions to an idle state after the inactivity timer expires, and the inactivity timer stops when the transmission and reception timer starts.

In a sixth aspect, alone or in combination with one or more of the first through fifth aspects, process 800 includes transmitting, during the time frame, an indication that the first device is capable of monitoring for physical downlink control channel communications in a DRX active time that is outside the time frame.

In a seventh aspect, alone or in combination with one or more of the first through sixth aspects, process 800 includes transmitting a bit to indicate the time frame or a recommendation of a maximum duration for the time frame.

In an eighth aspect, alone or in combination with one or more of the first through seventh aspects, process 800 includes receiving an indication to stop monitoring for PDCCH communications in a discontinuous reception active time before the time frame ends, stopping monitoring for PDCCH communications in response to receiving the indication, and stopping the continuous transmission and reception timer.

In a ninth aspect, alone or in combination with one or more of the first through eighth aspects, dynamically scheduling transmissions and receptions are restricted to a DRX active time.

In a tenth aspect, alone or in combination with one or more of the first through ninth aspects, a continuous transmission and reception timer, that corresponds to the duration of the time frame, starts from the slot.

In an eleventh aspect, alone or in combination with one or more of the first through tenth aspects, a continuous transmission and reception timer, that corresponds to the duration of the time frame, starts from a slot of a physical downlink control channel communication that is received in response to the SR.

In a twelfth aspect, alone or in combination with one or more of the first through eleventh aspects, a continuous transmission and reception timer, that corresponds to the duration of the time frame, starts from a slot of a preamble or the SDT.

In a thirteenth aspect, alone or in combination with one or more of the first through twelfth aspects, a continuous transmission and reception timer, that corresponds to the duration of the time frame, starts from a slot of a physical downlink control channel communication that is received in response to a preamble or the SDT.

In a fourteenth aspect, alone or in combination with one or more of the first through thirteenth aspects, process 800 includes entering a dormancy mode within a connected state based at least in part on a transmission and reception timer not running, wherein the transmission and reception timer corresponds to the duration of the time frame.

In a fifteenth aspect, alone or in combination with one or more of the first through fourteenth aspects, the dormancy mode applies to a primary cell and a secondary cell serving the first device.

In a sixteenth aspect, alone or in combination with one or more of the first through fifteenth aspects, process 800 includes turning off a main radio or setting the main radio to deep sleep, and monitoring for a low-power WUS via a wake-up radio.

In a seventeenth aspect, alone or in combination with one or more of the first through sixteenth aspects, process 800 includes stopping monitoring for PDCCH communications, suspending physical downlink shared channel (PDSCH) communications, and monitoring for a low-power WUS, stopping beam or CSI measurements, performing neighbor cell measurements on only a single type of reference signal, stopping SRS transmissions and PUSCH transmissions, or maintaining periodic and semi-persistent CSI reporting and stopping aperiodic CSI reporting.

In an eighteenth aspect, alone or in combination with one or more of the first through seventeenth aspects, the performing is based at least in part on an inactivity timer for entering the dormancy mode satisfying a time threshold.

In a nineteenth aspect, alone or in combination with one or more of the first through eighteenth aspects, process 800 include, in response to new uplink data arriving for a logic channel and being capable of continuous transmission and reception for the time frame, transmitting an SR in a slot.

In a twentieth aspect, alone or in combination with one or more of the first through eighteenth aspects, process 800 includes, in response to being in an idle or inactive state, communicating for a configured minimum time period in response to an initiation of an RRC connection setup, a resume request, or an uplink SDT.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
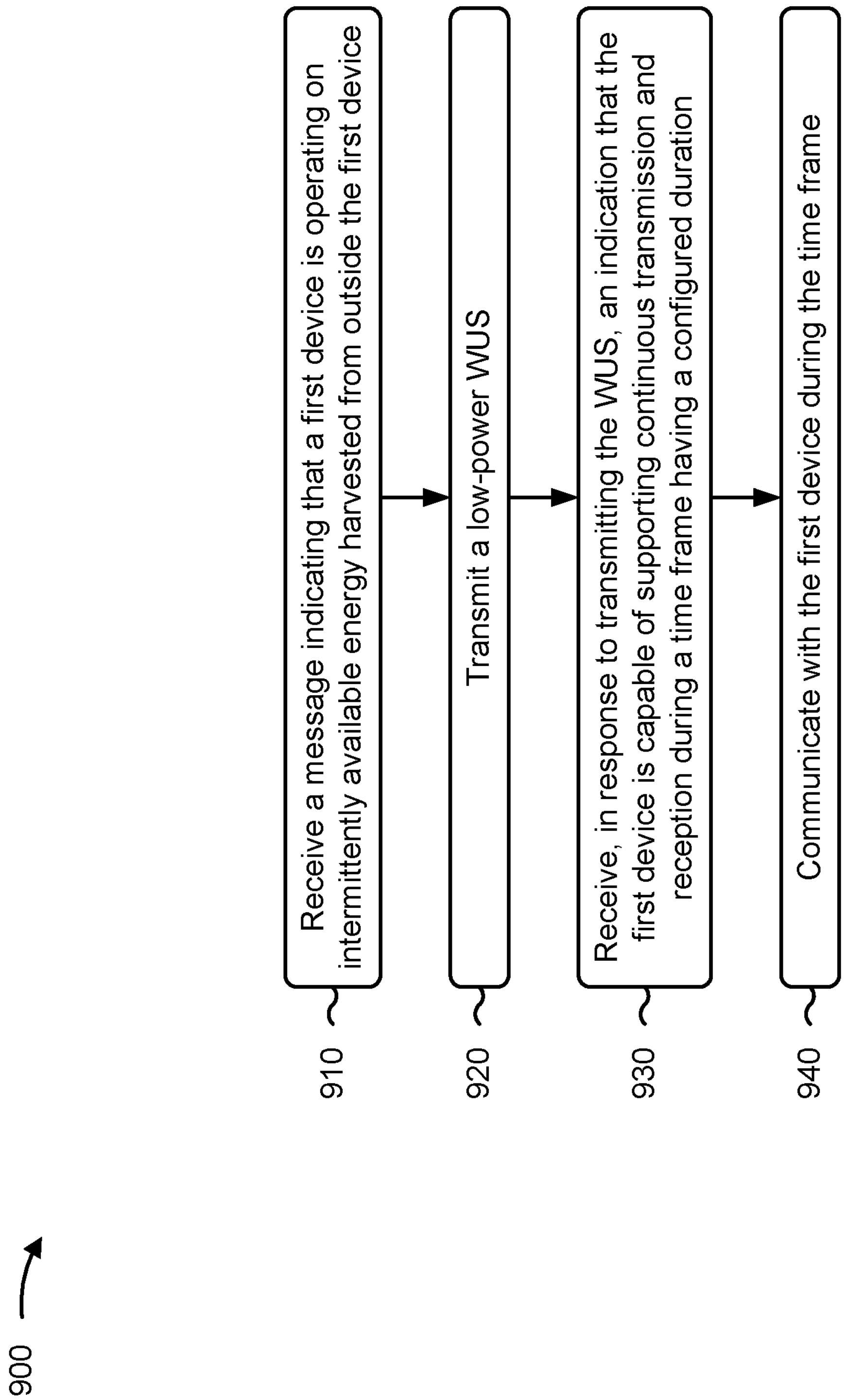
FIG. 9 is a diagram illustrating an example process performed, for example, by a second device, in accordance with the present disclosure.

FIG. 9 is a diagram illustrating an example process 900 performed, for example, by a second device, in accordance with the present disclosure. Example process 900 is an example where the second device (e.g., second device 520) performs operations associated with a communication time frame for an energy harvesting device.

As shown in FIG. 9, in some aspects, process 900 may include receiving a message indicating that a first device is operating on intermittently available energy harvested from outside the first device (block 910). For example, the second device (e.g., using communication manager 1108 and/or reception component 1102 depicted in FIG. 11) may receive a message indicating that a first device is operating on intermittently available energy harvested from outside the first device, as described above.

As further shown in FIG. 9, in some aspects, process 900 may include transmitting a low-power WUS (block 920). For example, the second device (e.g., using communication manager 1108 and/or transmission component 1104 depicted in FIG. 11) may transmit a low-power WUS, as described above.

As further shown in FIG. 9, in some aspects, process 900 may include receiving, in response to transmitting the WUS, an indication that the first device is capable of supporting continuous transmission and reception during a time frame having a configured duration (block 930). For example, the second device (e.g., using communication manager 1108 and/or reception component 1102 depicted in FIG. 11) may receive, in response to transmitting the WUS, an indication that the first device is capable of supporting continuous transmission and reception during a time frame having a configured duration, as described above.

As further shown in FIG. 9, in some aspects, process 900 may include communicating with the first device during the time frame (block 940). For example, the second device (e.g., using communication manager 1108, transmission component 1104, and/or reception component 1102 depicted in FIG. 11) may communicate with the first device during the time frame, as described above.

Process 900 may include additional aspects, such as any single aspect or any combination of aspects described below and/or in connection with one or more other processes described elsewhere herein.

In a first aspect, process 900 includes receiving, during the time frame, an indication that the first device is capable of extending the continuous transmission and reception into a next time frame, and communicating with the first device during the next time frame.

In a second aspect, alone or in combination with the first aspect, process 900 includes receiving, during the time frame, an indication that the first device is capable of monitoring for PDCCH communications in a DRX active time that is outside the time frame, and transmitting PDCCH communications in the DRX active time that is outside the time frame.

In a third aspect, alone or in combination with one or more of the first and second aspects, process 900 includes transmitting an indication to stop monitoring for PDCCH communications in a DRX active time before the time frame ends, and stopping transmission of PDCCH communications.

In a fourth aspect, alone or in combination with one or more of the first through third aspects, dynamically scheduling transmissions and receptions are restricted to a DRX active time.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
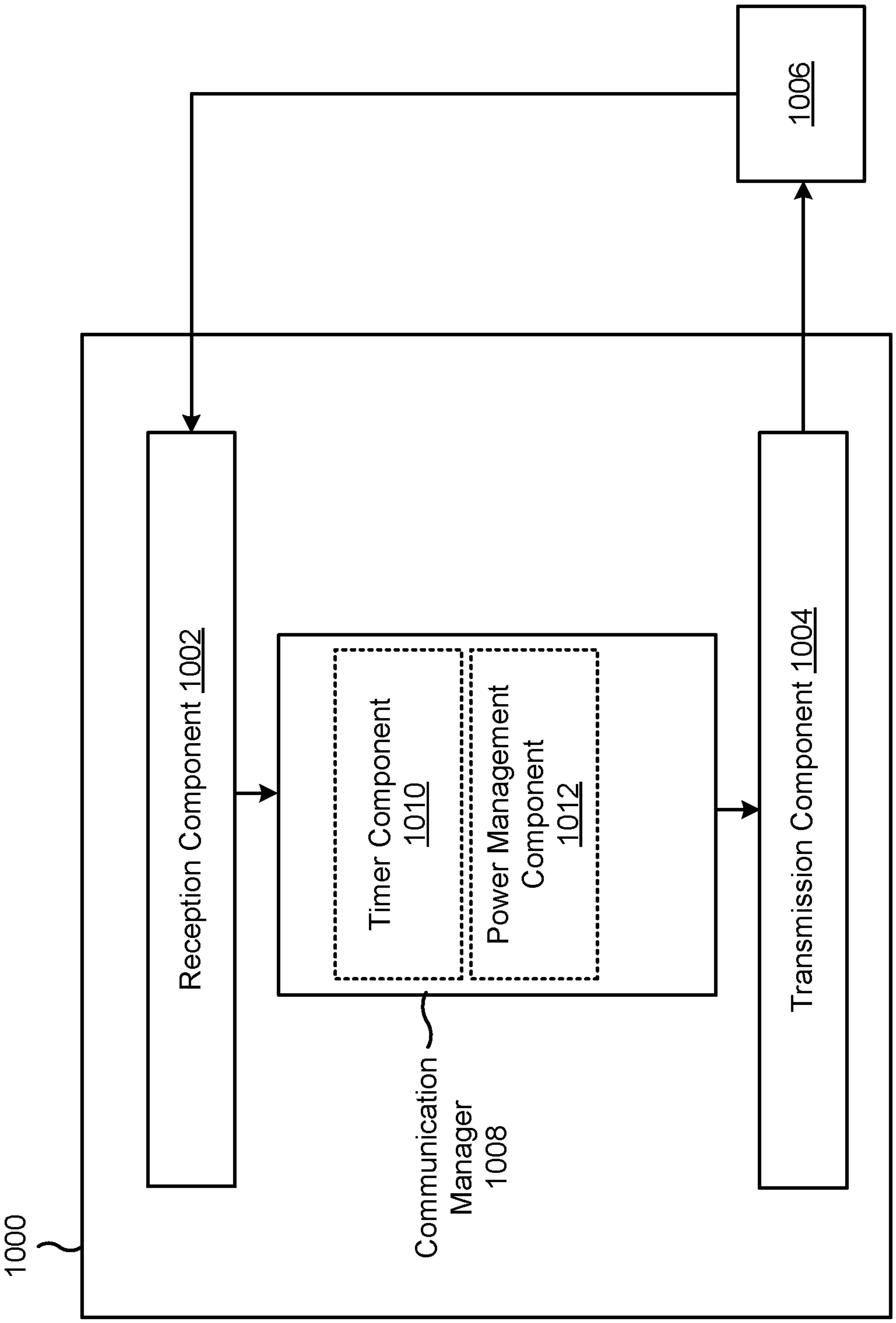
FIGS. 10-11 are diagrams of example apparatuses for wireless communication, in accordance with the present disclosure.

FIG. 10 is a diagram of an example apparatus 1000 for wireless communication. The apparatus 1000 may be a first device (e.g., an IoT device, a zero power device, a UE 120), or a first device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a network entity, a second device, or another wireless communication device) using the reception component 1002 and the transmission component 1004. As further shown, the apparatus 1000 may include the communication manager 1008. The communication manager 1008 may control and/or otherwise manage one or more operations of the reception component 1002 and/or the transmission component 1004. In some aspects, the communication manager 1008 may include one or more antennas, a modem, a controller/processor, a memory, or a combination thereof, of the UE 120 described in connection with FIG. 2. The communication manager 1008 may be, or be similar to, the communication manager 140 depicted in FIGS. 1 and 2. For example, in some aspects, the communication manager 1008 may be configured to perform one or more of the functions described as being performed by the communication manager 140. In some aspects, the communication manager 1008 may include the reception component 1002 and/or the transmission component 1004. The communication manager 1008 may include a timer component 1010 and/or a power management component 1012, among other examples.

In some aspects, the apparatus 1000 may be configured to perform one or more operations described herein in connection with FIGS. 1-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the first device described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the first device described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the first device described in connection with FIG. 2. In some aspects, the transmission component 1004 may be co-located with the reception component 1002 in a transceiver.

The transmission component 1004 may transmit a message indicating that the first device is operating on intermittently available energy harvested from outside the first device. The reception component 1002 may receive a low-power WUS. The transmission component 1004 may transmit, based at least in part on an energy harvesting state of the first device, an indication that the first device is capable of supporting continuous transmission and reception during a time frame having a configured duration. The transmission component 1004 and the reception component 1002 may communicate during the time frame.

The transmission component 1004 may transmit, during the time frame, an indication that the first device is capable of extending the continuous transmission and reception into a next time frame. The transmission component 1004 and the reception component 1002 may communicate during the next time frame.

The timer component 1010 may start a transmission and reception timer that corresponds to the duration of the time frame from the next discontinuous reception on duration. The timer component 1010 may stop the continuous transmission and reception timer.

The timer component 1010 may start an inactivity timer after the transmission and reception timer expires, the first device transitions to an idle state after the inactivity timer expires, and the inactivity timer stops when the transmission and reception timer starts.

The transmission component 1004 may transmit, during the time frame, an indication that the first device is capable of monitoring for physical downlink control channel communications in a DRX active time that is outside the time frame. The transmission component 1004 may transmit a bit to indicate the time frame or a recommendation of a maximum duration for the time frame. The reception component 1002 may receive an indication to stop monitoring for PDCCH communications in a DRX active time before the time frame ends. The reception component 1002 may stop monitoring for PDCCH communications in response to receiving the indication.

The power management component 1012 may enter a dormancy mode within a connected state based at least in part on a transmission and reception timer not running, wherein the transmission and reception timer corresponds to the duration of the time frame. The power management component 1012 may turn off a main radio or setting the main radio to deep sleep.

The reception component 1002 may monitor for a low-power WUS via a wake-up radio. The reception component 1002 may stop monitoring for physical downlink control channel communications, suspending physical downlink shared channel communications, and monitoring for a low-power WUS.

The reception component 1002 may stop beam or CSI measurements. The reception component 1002 may perform neighbor cell measurements on only a single type of reference signal. The transmission component 1004 may stop SRS transmissions and physical uplink shared channel transmissions. The transmission component 1004 may maintain periodic and semi-persistent CSI reporting and stop aperiodic CSI reporting.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
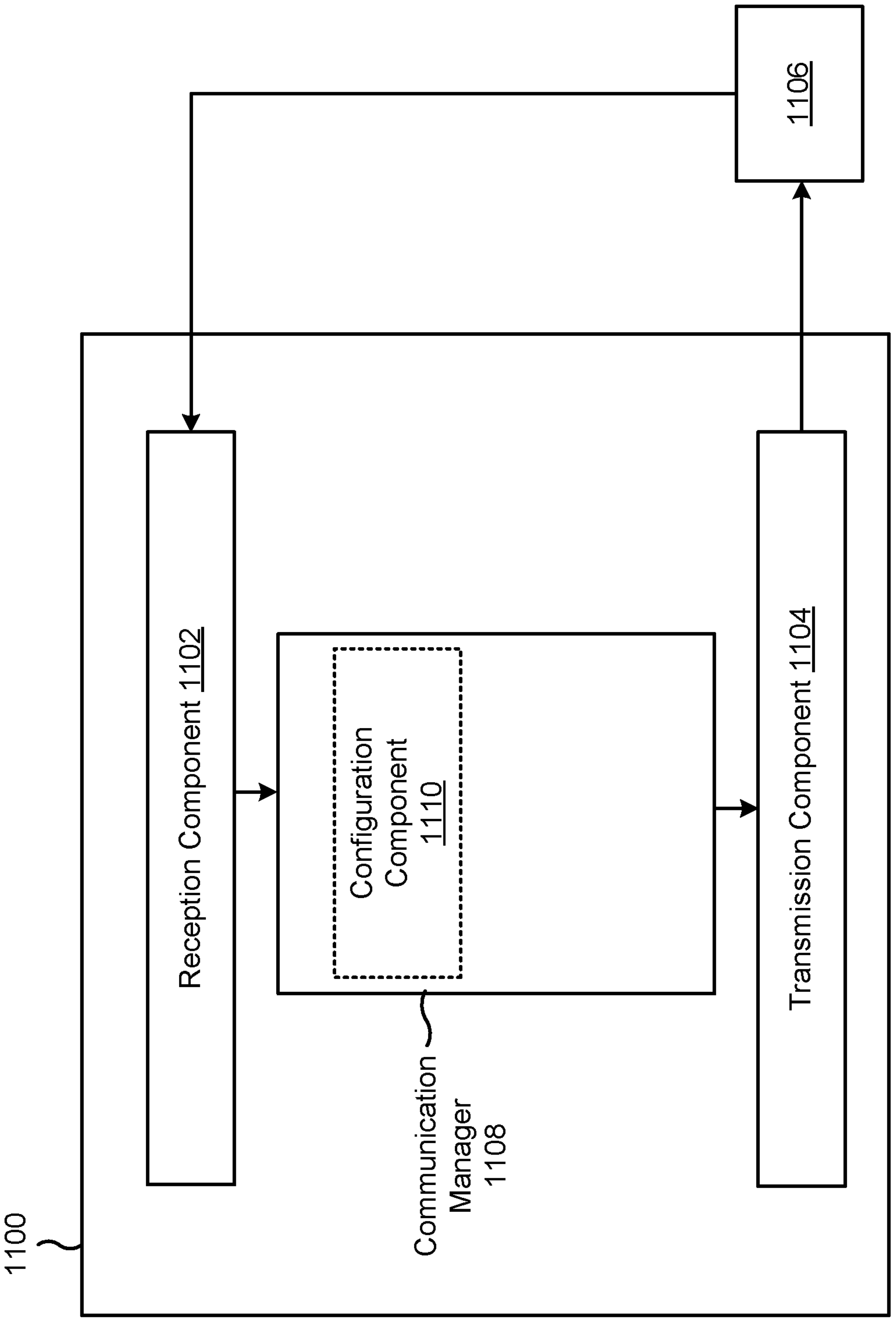

FIG. 11 is a diagram of an example apparatus 1100 for wireless communication. The apparatus 1100 may be a second device (e.g., a UE 120, network entity), or a second device may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, a first device, or another wireless communication device) using the reception component 1102 and the transmission component 1104. As further shown, the apparatus 1100 may include the communication manager 1108. The communication manager 1108 may control and/or otherwise manage one or more operations of the reception component 1102 and/or the transmission component 1104. In some aspects, the communication manager 1108 may include one or more antennas, a modem, a controller/processor, a memory, or a combination thereof, of the base station described in connection with FIG. 2. The communication manager 1108 may be, or be similar to, the communication manager 140 or 150 depicted in FIGS. 1 and 2. For example, in some aspects, the communication manager 1108 may be configured to perform one or more of the functions described as being performed by the communication manager 140 or 150. In some aspects, the communication manager 1108 may include the reception component 1102 and/or the transmission component 1104. The communication manager 1108 may include a configuration component 1110.

In some aspects, the apparatus 1100 may be configured to perform one or more operations described herein in connection with FIGS. 1-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the second device described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the second device described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the second device described in connection with FIG. 2. In some aspects, the transmission component 1104 may be co-located with the reception component 1102 in a transceiver.

The reception component 1102 may receive a message indicating that a first device is operating on intermittently available energy harvested from outside the first device. The transmission component 1104 may transmit a low-power WUS. The reception component 1102 may receive, in response to transmitting the WUS, an indication that the first device is capable of supporting continuous transmission and reception during a time frame having a configured duration. The transmission component 1104 and the reception component 1102 may communicate with the first device during the time frame.

The configuration component 1110 may configure the duration of the time frame based at least in part on information from the first device, a capability of the first device, information about intermittently available energy, channel conditions, and/or traffic conditions.

The reception component 1102 may receive, during the time frame, an indication that the first device is capable of extending the continuous transmission and reception into a next time frame. The transmission component 1104 and the reception component 1102 may communicate with the first device during the next time frame.

The reception component 1102 may receive, during the time frame, an indication that the first device is capable of monitoring for PDCCH communications in a DRX active time that is outside the time frame. The transmission component 1104 may transmit PDCCH communications in the DRX active time that is outside the time frame. The transmission component 1104 may transmit an indication to stop monitoring for PDCCH communications in a DRX active time before the time frame ends. The transmission component 1104 may stop transmission of PDCCH communications.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a first device, comprising: transmitting a message indicating that the first device is operating on intermittently available energy harvested from outside the first device; receiving a low-power wakeup signal (WUS); transmitting, based at least in part on an energy harvesting state of the first device, an indication that the first device is capable of supporting continuous transmission and reception during a time frame having a configured duration; and communicating during the time frame.

Aspect 2: The method of Aspect 1, wherein transmitting the indication includes transmitting the indication in response to the WUS.

Aspect 3: The method of Aspect 1 or 2, wherein the energy harvesting state is based at least in part on one or more of an amount of the intermittently available energy that is being harvested or an amount of harvested energy that is being stored at the first device.

Aspect 4: The method of any of Aspects 1-3, further comprising: transmitting, during the time frame, an indication that the first device is capable of extending the continuous transmission and reception into a next time frame; and communicating during the next time frame.

Aspect 5: The method of any of Aspects 1-4, further comprising starting a transmission and reception timer that corresponds to the duration of the time frame from the next discontinuous reception on duration.

Aspect 6: The method of Aspect 5, further comprising starting an inactivity timer after the transmission and reception timer expires, wherein the first device transitions to an idle state after the inactivity timer expires, and wherein the inactivity timer stops when the transmission and reception timer starts.

Aspect 7: The method of any of Aspects 1-6, further comprising transmitting, during the time frame, an indication that the first device is capable of monitoring for physical downlink control channel communications in a discontinuous reception active time that is outside the time frame.

Aspect 8: The method of any of Aspects 1-7, further comprising transmitting a bit to indicate the time frame or a recommendation of a maximum duration for the time frame.

Aspect 9: The method of any of Aspects 1-8, further comprising: receiving an indication to stop monitoring for physical downlink control channel (PDCCH) communications in a discontinuous reception active time before the time frame ends; stopping monitoring for PDCCH communications in response to receiving the indication; and stopping the continuous transmission and reception timer.

Aspect 10: The method of any of Aspects 1-9, wherein dynamically scheduled transmissions and receptions are restricted to a discontinuous reception active time.

Aspect 11: The method of any of Aspects 1-10, further comprising, in response to new uplink data arriving for a logic channel and being capable of continuous transmission and reception for the time frame, transmitting a scheduling request (SR) in a slot.

Aspect 12: The method of Aspect 11, wherein a continuous transmission and reception timer, that corresponds to the duration of the time frame, starts from the slot.

Aspect 13: The method of Aspect 11, wherein a continuous transmission and reception timer, that corresponds to the duration of the time frame, starts from a slot of a physical downlink control channel communication that is received in response to the SR.

Aspect 14: The method of any of Aspects 1-13, further comprising, in response to being in an idle or inactive state, communicating for a configured minimum time period in response to an initiation of a radio resource control connection setup, a resume request, or an uplink small data transmission (SDT).

Aspect 15: The method of Aspect 14, wherein a continuous transmission and reception timer, that corresponds to the duration of the time frame, starts from a slot of a preamble or the SDT.

Aspect 16: The method of Aspect 14, wherein a continuous transmission and reception timer, that corresponds to the duration of the time frame, starts from a slot of a physical downlink control channel communication that is received in response to a preamble or the SDT.

Aspect 17: The method of any of Aspects 1-16, further comprising entering a dormancy mode within a connected state based at least in part on a transmission and reception timer not running, wherein the transmission and reception timer corresponds to the duration of the time frame.

Aspect 18: The method of Aspect 17, wherein the dormancy mode applies to a primary cell and a secondary cell serving the first device.

Aspect 19: The method of Aspect 18, further comprising, when operating in the dormancy mode: turning off a main radio or setting the main radio to deep sleep; and monitoring for a low-power WUS via a wake-up radio.

Aspect 20: The method of Aspect 18, further comprising, when operating in the dormancy mode, performing one or more of: stopping monitoring for physical downlink control channel communications, suspending physical downlink shared channel communications, and monitoring for a low-power WUS; stopping beam or channel state information (CSI) measurements; performing neighbor cell measurements on only a single type of reference signal; stopping sounding reference signal transmissions and physical uplink shared channel transmissions; or maintaining periodic and semi-persistent CSI reporting and stopping aperiodic CSI reporting.

Aspect 21: The method of Aspect 20, wherein the performing is based at least in part on an inactivity timer for entering the dormancy mode satisfying a time threshold.

Aspect 22: A method of wireless communication performed by a second device, comprising: receiving a message indicating that a first device is operating on intermittently available energy harvested from outside the first device; transmitting a low-power wakeup signal (WUS); receiving, in response to transmitting the WUS, an indication that the first device is capable of supporting continuous transmission and reception during a time frame having a configured duration; and communicating with the first device during the time frame.

Aspect 23: The method of Aspect 22, further comprising: receiving, during the time frame, an indication that the first device is capable of extending the continuous transmission and reception into a next time frame; and communicating with the first device during the next time frame.

Aspect 24: The method of Aspect 22 or 23, further comprising: receiving, during the time frame, an indication that the first device is capable of monitoring for physical downlink control channel (PDCCH) communications in a discontinuous reception (DRX) active time that is outside the time frame; and transmitting PDCCH communications in the DRX active time that is outside the time frame.

Aspect 25: The method of Aspect 22 or 23, further comprising: transmitting an indication to stop monitoring for physical downlink control channel (PDCCH) communications in a discontinuous reception active time before the time frame ends; and stopping transmission of PDCCH communications.

Aspect 26: The method of any of Aspects 22-25, wherein dynamically scheduled transmissions and receptions are restricted to a discontinuous reception active time.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first device for wireless communication, comprising:
a memory; and
one or more processors, coupled to the memory, configured to:
transmit a message indicating that the first device is operating on intermittently available energy harvested from outside the first device;
receive a low-power wakeup signal (WUS);
transmit, based at least in part on an energy harvesting state of the first device, an indication that the first device is capable of supporting continuous transmission and reception during a time frame having a configured duration; and
communicate during the time frame.

2. The first device of claim 1, wherein the one or more processors, to transmit the indication, are configured to transmit the indication in response to the WUS.

3. The first device of claim 1, wherein the energy harvesting state is based at least in part on one or more of an amount of the intermittently available energy that is being harvested or an amount of harvested energy that is being stored at the first device.

4. The first device of claim 1, wherein the one or more processors are configured to:
transmit, during the time frame, an indication that the first device is capable of extending the continuous transmission and reception into a next time frame; and
communicate during the next time frame.

5. The first device of claim 1, wherein the one or more processors are configured to start a transmission and reception timer that corresponds to the duration of the time frame from the next discontinuous reception on duration.

6. The first device of claim 5, wherein the one or more processors are configured to start an inactivity timer after the transmission and reception timer expires, wherein the first device transitions to an idle state after the inactivity timer expires, and wherein the inactivity timer stops when the transmission and reception timer starts.

7. The first device of claim 1, wherein the one or more processors are configured to transmit, during the time frame, an indication that the first device is capable of monitoring for physical downlink control channel communications in a discontinuous reception active time that is outside the time frame.

8. The first device of claim 1, wherein the indication includes a bit to indicate the time frame or a recommendation of a maximum duration for the time frame.

9. The first device of claim 1, wherein the one or more processors are configured to:

receive an indication to stop monitoring for physical downlink control channel (PDCCH) communications in a discontinuous reception active time before the time frame ends;

stop monitoring for PDCCH communications in response to receiving the indication; and stop the continuous transmission and reception timer.

10. The first device of claim 1, wherein dynamically scheduled transmissions and receptions are restricted to a discontinuous reception active time.

11. The first device of claim 1, wherein the one or more processors are configured to, in response to new uplink data arriving for a logic channel and being capable of continuous transmission and reception for the time frame, transmit a scheduling request (SR) in a slot.

12. The first device of claim 11, wherein a continuous transmission and reception timer, that corresponds to the duration of the time frame, starts from the slot.

13. The first device of claim 11, wherein a continuous transmission and reception timer, that corresponds to the duration of the time frame, starts from a slot of a physical downlink control channel communication that is received in response to the SR.

14. The first device of claim 1, wherein the one or more processors are configured to, in response to being in an idle or inactive state, communicating for a time frame in response to an initiation of a radio resource control connection setup, a resume request, or an uplink small data transmission (SDT).

15. The first device of claim 14, wherein a continuous transmission and reception timer, that corresponds to the duration of the time frame, starts from a slot of a preamble or the SDT.

16. The first device of claim 14, wherein a continuous transmission and reception timer, that corresponds to the duration of the time frame, starts from a slot of a physical downlink control channel communication that is received in response to a preamble or the SDT.

17. The first device of claim 1, wherein the one or more processors are configured to enter a dormancy mode within a connected state based at least in part on a transmission and reception timer not running, wherein the transmission and reception timer corresponds to the duration of the time frame.

18. The first device of claim 17, wherein the dormancy mode applies to a primary cell and a secondary cell serving the first device.

19. The first device of claim 18, wherein the one or more processors are configured to, when operating in the dormancy mode:

turn off a main radio or setting the main radio to deep sleep; and monitor for a low-power WUS via a wake-up radio.

20. The first device of claim 18, wherein the one or more processors are configured to, when operating in the dormancy mode, performing one or more of:

stop monitoring for physical downlink control channel communications, suspending physical downlink shared channel communications, and monitoring for a low-power WUS;

stop beam or channel state information (CSI) measurements;

perform neighbor cell measurements on only a single type of reference signal;

stop sounding reference signal transmissions and physical uplink shared channel transmissions; or maintain periodic and semi-persistent CSI reporting and stopping aperiodic CSI reporting.

21. The first device of claim 20, wherein the performing is based at least in part on an inactivity timer for entering the dormancy mode satisfying a time threshold.

22. A second device for wireless communication, comprising:

a memory; and one or more processors, coupled to the memory, configured to:

receive a message indicating that a first device is operating on intermittently available energy harvested from outside the first device;

transmit a low-power wakeup signal (WUS);

receive, in response to transmitting the WUS, an indication that the first device is capable of supporting continuous transmission and reception during a time frame having a configured duration; and communicate with the first device during the time frame.

23. The second device of claim 22, wherein the one or more processors are configured to:

receive, during the time frame, an indication that the first device is capable of extending the continuous transmission and reception into a next time frame; and communicate with the first device during the next time frame.

24. The second device of claim 22, wherein the one or more processors are configured to:

receive, during the time frame, an indication that the first device is capable of monitoring for physical downlink control channel (PDCCH) communications in a discontinuous reception (DRX) active time that is outside the time frame; and transmit PDCCH communications in the DRX active time that is outside the time frame.

25. The second device of claim 22, wherein the one or more processors are configured to:

transmit an indication to stop monitoring for physical downlink control channel (PDCCH) communications in a discontinuous reception active time before the time frame ends; and stop transmission of PDCCH communications.

26. The second device of claim 22, wherein dynamically scheduled transmissions and receptions are restricted to a discontinuous reception active time.

27. A method of wireless communication performed by a first device, comprising:

transmitting a message indicating that the first device is operating on intermittently available energy harvested from outside the first device;

receiving a low-power wakeup signal (WUS);

transmitting, based at least in part on an energy harvesting state of the first device, an indication that the first device is capable of supporting continuous transmission and reception during a time frame having a configured duration; and communicating during the time frame.

28. The method of claim 27, further comprising transmitting, during the time frame, an indication that the first device is capable of monitoring for physical downlink control channel communications in a discontinuous reception active time that is outside the time frame.

29. The method of claim 27, further comprising entering a dormancy mode within a connected state based at least in part on a transmission and reception timer not running, wherein the transmission and reception timer corresponds to the duration of the time frame.

30. A method of wireless communication performed by a second device, comprising:

receiving a message indicating that a first device is operating on intermittently available energy harvested from outside the first device;

transmitting a low-power wakeup signal (WUS);

receiving, in response to transmitting the WUS, an indication that the first device is capable of supporting continuous transmission and reception during a time frame having a configured duration; and communicating with the first device during the time frame.

* * * * *